US006795187B2

(12) United States Patent
Kokura

(10) Patent No.: US 6,795,187 B2
(45) Date of Patent: Sep. 21, 2004

(54) FORKLIFT HAVING A LIGHT SOURCE AND LENS COMBINATION THAT PROVIDES A SHAPED LIGHT BEAM

(75) Inventor: Kazumasa Kokura, Osaka (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 406 days.

(21) Appl. No.: 10/092,475

(22) Filed: Mar. 8, 2002

(65) Prior Publication Data

US 2002/0089668 A1 Jul. 11, 2002

Related U.S. Application Data

(63) Continuation of application No. 09/497,643, filed on Feb. 3, 2000.

(30) Foreign Application Priority Data

Feb. 4, 1999 (JP) ............................................ 11-27025

(51) Int. Cl.[7] .......................... G01C 1/00; G01B 11/00; G01B 11/24

(52) U.S. Cl. ........................ 356/399; 356/138; 356/614

(58) Field of Search ................................ 356/399, 138, 356/614

(56) References Cited

U.S. PATENT DOCUMENTS

| | | | |
|---|---|---|---|
| 3,854,820 | A | 12/1974 | Hansen |
| RE29,025 | E | 11/1976 | Hansen |
| 4,279,328 | A | 7/1981 | Ahlbom |
| 4,683,493 | A | 7/1987 | Taft et al. |
| 4,815,845 | A | 3/1989 | Colbaugh et al. |
| 5,208,753 | A | 5/1993 | Acuff |
| 6,150,938 | A | 11/2000 | Sower et al. |

FOREIGN PATENT DOCUMENTS

| | | | |
|---|---|---|---|
| EP | 0 014 586 A1 | | 8/1980 |
| GB | 1 322 043 | | 7/1973 |
| GB | 1 540 705 | | 2/1979 |
| JP | 9183600 | * | 7/1997 |
| JP | 11-5700 | | 1/1999 |

* cited by examiner

*Primary Examiner*—Zandra V. Smith
(74) *Attorney, Agent, or Firm*—Sughrue Mion, PLLC

(57) ABSTRACT

There is provided a forklift in which a mast upstands in front of the body of the forklift, a lift bracket is mounted on the mast in a vertically movable manner, and a fork is engaged with the lift bracket, wherein a laser light source which illuminates an area in front of the fork is attached to the lift bracket or the fork, and a light beam emitted from the laser light source is formed into a shape which laterally elongates, via a lens.

5 Claims, 3 Drawing Sheets

FORKLIFT HAVING A LIGHT SOURCE AND LENS COMBINATION THAT PROVIDES A SHAPED LIGHT BEAM

This is a Continuation of application Ser. No. 09/497,643 (filed Feb. 3, 2000, and allowed Jan. 10, 2002), the disclosure of which is incorporated herein by reference.

BACKGROUND OF THE INVENTION

1. Field of the Invention

The present invention relates to a forklift in which when a load is to be loaded on a pallet or a rack, the pallet or the like is illuminated with a laser beam so that its position is visually recognized.

2. Description of the Related Art

In a conventional forklift using a laser light source, as shown in FIG. 2, a light spot projected onto a pallet 17 has a spot-like shape.

As described above, in an optical pallet detecting device using a laser light source, conventionally, a light spot projected onto the pallet 17 has a spot-like shape. As shown in FIG. 2, when the light beam impinges on an insertion hole 17*a* of the pallet 17, therefore, a light spot 18*a* is not formed as indicated by a chain line 18*b*. When the light beam impinges on a gap between adjacent loads 19, a light spot 23*a* is not formed as indicated by a chain line 23*b*. As a result, there arises a problem in that sight of the impinging position is not lost.

SUMMARY OF THE INVENTION

According to the invention, the problem is solved by a forklift in which a mast upstands in front of a body of the forklift, a lift bracket is mounted on the mast in a vertically movable manner, and a fork is engaged with the lift bracket, wherein a laser light source which illuminates an area in front of the fork is attached to the lift bracket or the fork, and a light beam emitted from the laser light source is formed into a shape which laterally elongates, via a lens.

BRIEF DESCRIPTION OF THE DRAWINGS

Each of FIGS. 6A to 6F shows a lens having a sectional cross shape according to the present invention, in which.

DETAILED DESCRIPTION OF THE PRESENT INVENTION

Function

Figure 3:
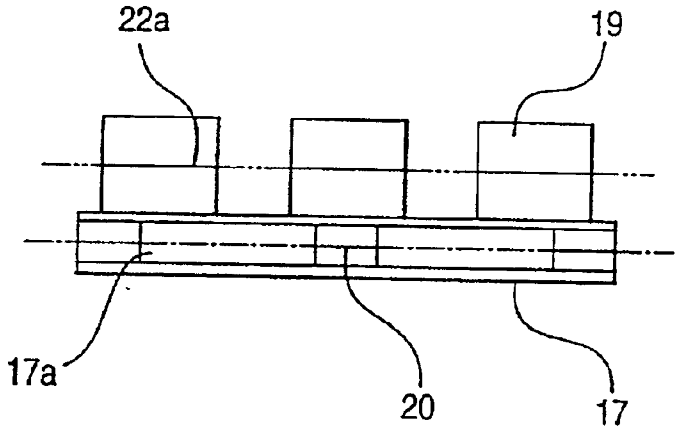
FIG. 3 shows light spots in a pallet face and formed by an optical pallet detecting device in the invention.

When a light beam is emitted toward a pallet from a laser light source which is attached to a lift bracket or a fork so as to illuminate tines of the fork, the light beam which is expanded by the lens into a fan-like shape in a plan view impinges on the pallet. As a result, as shown in FIG. 3, a linear light spot 20 is formed which extends over right and left ends and a center beam portion that cooperate to form fork insertion openings 17*a* between a deckboard and an edgeboard.

Description of the Present Invention

The description will be described in detail with reference to the accompanying drawings. Firstly, an optical pallet detecting device will be described with reference to FIG. 1. An optical pallet detecting device 1 comprises a connector 3 which is connected to an electric energy source via an electric wire 8, a laser light source 4, a lens 5, and a lens fixing member 6. These components are fixed to the inside of a hollow cylinder 10.

Figure 1:
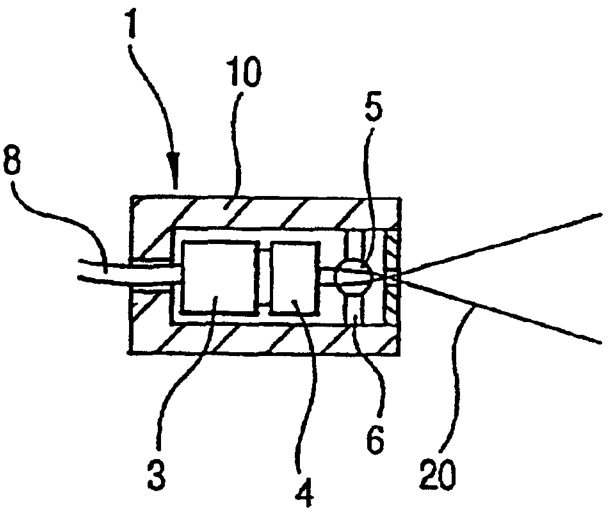
FIG. 1 is a plan sectional view of an optical pallet detecting device in the invention.
Figure 2:
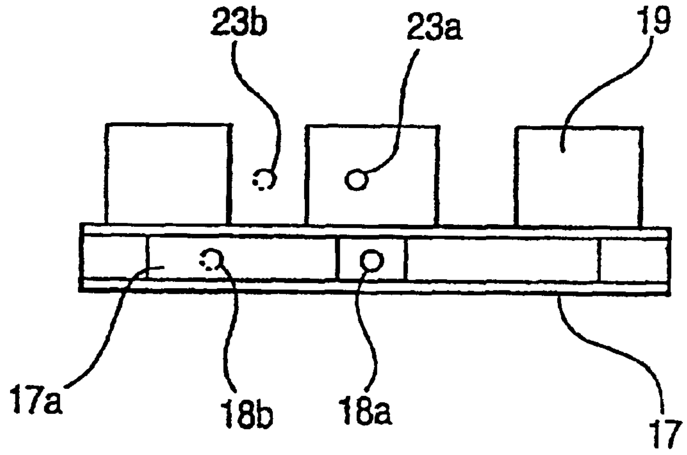
FIG. 2 PRIOR ART
FIG. 2 shows light spots in a pallet face and formed by an optical pallet detecting device of the conventional art.

The lens 5 has a cylindrical shape having the center axis which elongates in the direction perpendicular to the sheet in FIG. 1. A linear light beam emitted from the laser light source 4 is refracted by the cylindrical lens 5 to be expanded into a fan-like shape in a plan view as shown in FIG. 1, i.e., a shape which laterally elongates in a horizontal plane in the illumination plane. Since the lens 5 has a cylindrical shape, the light is not vertically expanded.

Figure 4:
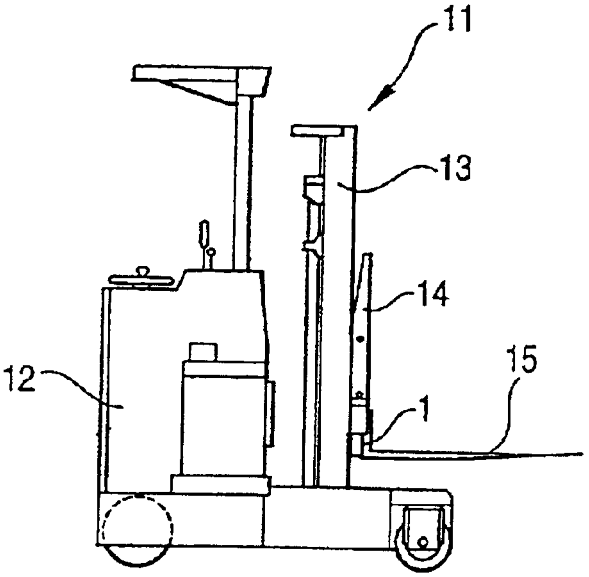
FIG. 4 is a side view showing a forklift having the optical pallet detecting device in the invention.
Figure 5:
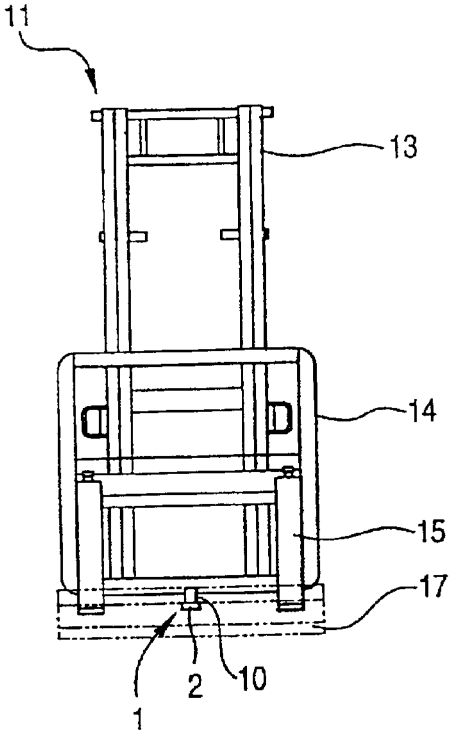
FIG. 5 is a front view illustrating an attachment state on a lift bracket.

An example in which the device is mounted on a forklift will be described with reference to FIG. 4 which is a side view. The forklift 11 comprises the body 12, a mast 13, a lift bracket 14, and a fork 15. The lift bracket 14 is vertically moved, and, in accordance with this movement, also the fork 15 is vertically moved.

The optical pallet detecting device 1 is attached to the lift bracket 14, at a position where the device can perform illumination along the same plane as the tines of the fork and on a straight line.

According to this configuration, as shown in FIG. 3, the laser light emitted from the detecting device 1 forms a light spot having a predetermined length in the direction of a horizontal plane or a direction parallel to a pallet. When the light spot impinges on a pallet, the light spot has a shape which laterally elongates, as indicated by 20, so that a wide range including the insertion openings 17*a* of the pallet 17 is irradiated. When the light spot impinges on a load 19 placed on the pallet 17, the load 19 can be surely irradiated regardless of the placement position of the load 19, as indicated by 22*a*.

As described above, the optical pallet detecting device 1 is attached to the position where the device can perform illumination along the same plane as the tines of the fork and on a straight line. When the forklift 11 is advanced after the light spot is formed as indicated by 20 in FIG. 3, therefore, the fork 15 can be surely inserted into the insertion openings 17*a* of the pallet 17.

When the lens 5 is configured so as to be detachable from the cylinder 10, the light spot of the laser light can be changed so as to be formed into a spot-like shape in the same manner as the conventional art described above, thereby enabling the device to be used more conveniently.

While the lens 5 is a cylindrical convex lens, a cylindrical concave lens may be used in place of the cylindrical convex lens 5 so as to expand the laser light in one direction.

Figure 6A:
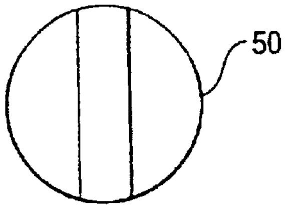
FIG. 6A is an top side view of the lens.
Figure 6B:
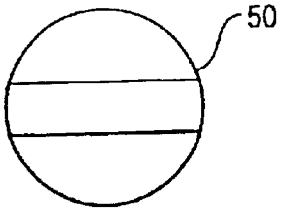
FIG. 6B is a left side view of the lens.
Figure 6C:
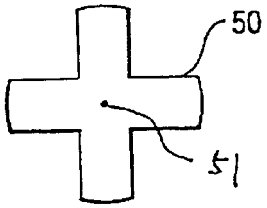
FIG. 6C is a front side view of the lens.
Figure 6D:
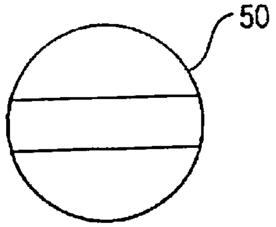
FIG. 6D is a right side view of the lens.
Figure 6E:
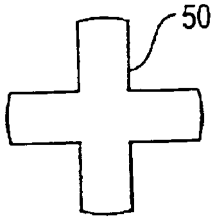
FIG. 6E is a back side view of the lens.
Figure 6F:
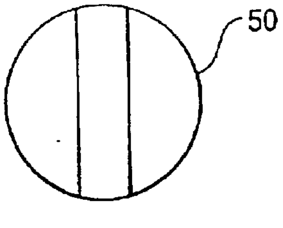
FIG. 6F is a bottom side view of the lens.

In addition, as shown in FIGS. 6A to 6F, a lens 50 may be used in place of the lens 5. Each of FIGS. 6A to 6F shows the lens 50 in view from each of six different directions three-dimensionally perpendicular to each other. FIGS. 6C and 6E are a front side view and a back side view of the lens 50, respectively. In FIG. 6C, a reference numeral 51 denotes a center of the cross on the lens surface. The lens 50 is formed in such a manner that a lens having a spherical body is cut to be in section in the shape of the cross, so that the lens 50 is seen in the shape of the cross when looking at the lens 50 from the front side direction or the back side direction.

In the case of the lens 50, as shown in FIG. 6C, the center 51 of the cross of the lens 50 is illuminated with a beam of the laser light from the front side direction from which the lens 50 is seen in the shape of the cross. The lens refracts the laser light so as to expand the laser light in accordance with the shape of the lens 50. Thereafter, the laser light is emitted outside of the lens 50 to illuminate the pallet 17. A shape of the laser light illuminating the pallet 17 is a cross.

Accordingly, in the case where an user uses an optical pallet detecting device having the lens 50, the user can understand a position of the fork 15 in the vertical direction from a horizontal line of the cross shape of the laser light illuminating the pallet 17. Moreover, the user can understand a position of the fork 15 in the horizontal direction from a vertical line of the cross shape of the laser light illuminating the pallet 17. As a result, the position of the fork can be simultaneously understood in the vertical direction and the horizontal direction by using the lens 50.

Because the shape of the illuminated cross of the laser light has a certain degree of length in the horizontal direction and the vertical direction, if the center of the cross has a little gap from the pallet, the user can easily adjust the center of the cross to the desirable position without missing the illuminated position of the laser light.

As mentioned above, the lens 50 may be configured so as to be detachable from the cylinder 10, so that the light spot of the laser light can be changed so as to be formed into a spot-like shape or a line shape according to each of situations, thereby enabling the device to be used more conveniently.

According to the invention, as described above, the light beam emitted from the laser light source is formed into a lateral shape which elongates in the width direction of a pallet. The light spot 20 is surely formed in a gap between a load and another load 9, the insertion openings of the pallet 17, and the like. Namely, the light spot 20 which laterally elongates is always formed. As a result, the invention attains an effect that the operator is prevented from losing sight of the light spot 20 and hence loading and unloading works can be smoothly conducted.

What is claimed is:

1. A forklift comprising:

a main body;

a mast disposed on said main body;

a load handling device mounted for movement on said mast in a first direction;

a light source disposed on said load handling device; and a lens disposed adjacent to said light source, wherein a light beam emitted from said light source passes through said lens and is formed into a shape having a cross section that is elongated in a second direction that is substantially perpendicular to said first direction, wherein said load handling device includes (1) a lift bracket mounted on said mast, and (2) a fork engaged with said lift bracket, wherein said light source is mounted on a center of said lift bracket.

2. The forklift as claimed in claim 1, wherein said lens has a cylindrical shape having a center axis in parallel to said first direction and perpendicular to a light propagation direction.

3. The forklift as claimed in claim 1, wherein said first direction is a vertical direction, and said second direction is a horizontal direction.

4. The forklift as claimed in claim 1, wherein said light source is a laser light source.

5. The forklift as claimed in claim 1, wherein said light source emits said light beam in a third direction that is substantially perpendicular to said first and said second directions.

* * * * *